United States Patent
Groos

[15] 3,651,680
[45] Mar. 28, 1972

[54] TUBE PRESS WITH MANDREL ADJUSTMENT

[72] Inventor: Horst Hans Groos, Metzkausen, Germany

[73] Assignee: Schloemann Aktiengesellschaft, Dusseldorf, Germany

[22] Filed: Dec. 10, 1969

[21] Appl. No.: 883,901

[52] U.S. Cl.................................................72/265, 72/273
[51] Int. Cl........................................B21c 23/20, B21c 25/00
[58] Field of Search.....................................72/265, 264, 273

[56] References Cited

UNITED STATES PATENTS

| | | | |
|---|---|---|---|
| 3,277,692 | 10/1966 | Gettig | 72/265 X |
| 3,123,215 | 3/1964 | Zilges | 72/265 |
| 3,391,566 | 7/1968 | Linnerz | 72/273 |

Primary Examiner—Charles W. Lanham
Assistant Examiner—R. M. Rogers
Attorney—Holman & Stern

[57] ABSTRACT

Some tube presses need a device for adjusting both the longitudinal position and the angular position of the mandrel. The longitudinal position of the mandrel is adjusted by rotating a nut on a spindle connected to the mandrel. Previously such devices have included separate coupling members for preventing rotation of the spindle with respect to the nut and rotation of the spindle with respect to the press. I now provide a single coupling member which is rotationally fixed with respect to the spindle and which can move between two positions, in one of which the spindle is rotationally fixed with respect to the nut and in the other of which the spindle is rotationally fixed with respect to the press.

6 Claims, 4 Drawing Figures

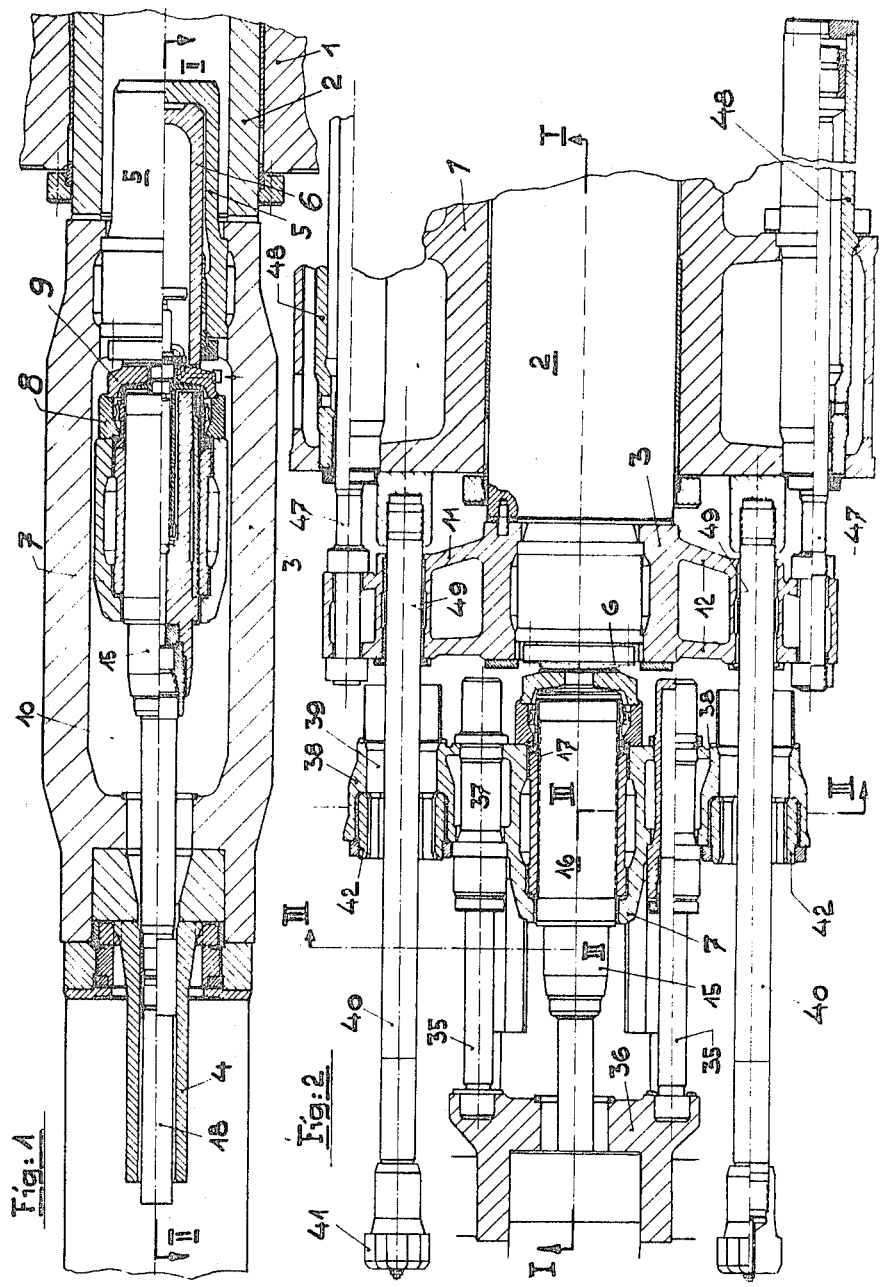

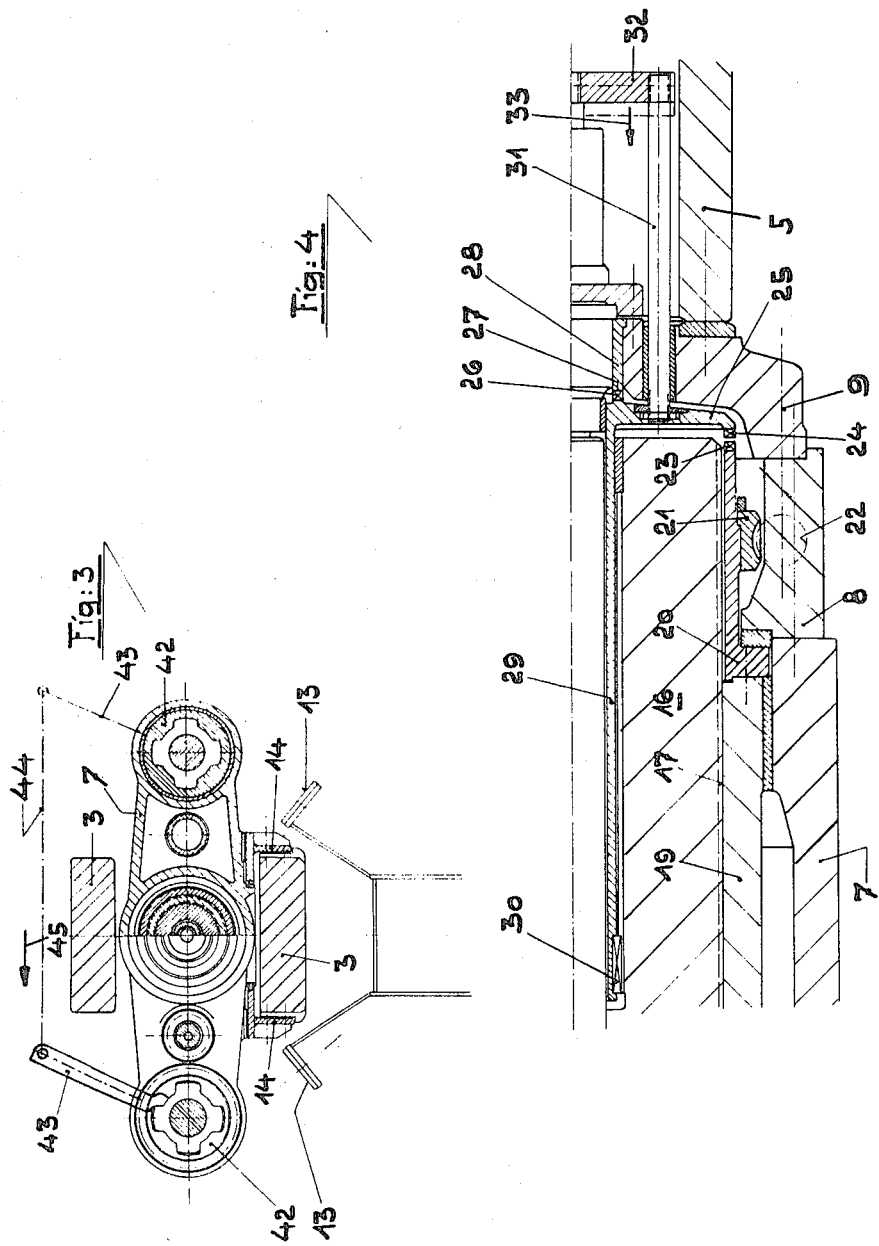

TUBE PRESS WITH MANDREL ADJUSTMENT

The invention relates to a press for forming tubes (usually metal tubes), the press having a device for adjusting the longitudinal position of the mandrel to which a rotatable nut is screwed on to a screw-threaded spindle connected to the mandrel holder, the nut being carried by a carrying member (for instance a mandrel crosshead) which is movable in a longitudinal direction with respect to the press; the spindle can be rotated and can be locked either with respect to the nut or with respect to the carrying member.

It is thus possible to adjust the longitudinal position of the mandrel and to adjust the angular position of the mandrel. The latter adjustment is necessary when nonround tubes are being extruded and the mandrel has to be centered relative to the shaped die, while the adjustment of the longitudinal position of the mandrel is necessary to make it possible to use mandrels of different lengths. Mandrels of different lengths may be used either because the mandrels become worn or because of the diameter of mandrel required, those of smaller diameter generally being shorter for reasons of strength.

In one arrangement for adjusting the longitudinal position and angular position of the mandrel, there are two independent coupling members, one of which is connected to the nut and the other of which is connected to an extension on the end of the press ram piston, the connections being either rotatable or fixed. This mandrel adjusting system is however costly and is also difficult to operate and can be unreliable in operation since it is possible to fix both securing members simultaneously; in the latter circumstances, if a drive motor is actuated to rotate the nut (for instance using a worm drive), the mandrel adjusting system would be seriously damaged. Another, less harmful possibility of incorrect operation, which nonetheless must be possible at any time in practice, is that both securing members may simultaneously be rotatable or only half-tightened so that when the drive motor is actuated, the desired adjustment would not occur. In addition, when the press ram piston is used to carry one of the securing members, construction costs are increased by having to secure the ram piston against rotation.

According to the present invention, there is provided a press for forming tubes, the press having
   a mandrel holder,
   a screw-threaded spindle connected to the mandrel holder,
   a rotatable nut for adjusting the position of the spindle and of the mandrel holder in a longitudinal direction,
   a carrying member (for instance a mandrel crosshead) carrying the nut, the carrying member being movable in a longitudinal direction with respect to the press,
   means for rotating the spindle and moving the spindle longitudinally, normally by rotating the nut,
   a coupling member movable in a longitudinal direction with respect to the spindle and to the nut but rotationally fixed with respect to the spindle, and
   means for moving the coupling member in a longitudinal direction between one position in which the coupling member couples with the nut and another position in which the coupling member couples with the carrying member.

The invention can simplify the design and operation of the mandrel adjustment system and increase the reliability of the press in operation.

Said positions of the coupling member are preferably end positions of its longitudinal movement with respect to the nut. In order to provide mating connections between the coupling member and the nut or carrying member, the coupling member may have teeth or dogs on each of opposite end portions, and the nut and the carrying member may have corresponding teeth or dogs, so that in said one position the teeth or dogs on the nut engage with the teeth or dogs on one end portion of the coupling member and in said other position, the teeth or dogs on the carrying member engage with the teeth or dogs on the other end portion of the coupling member. That is to say that when one set of teeth or dogs disengages, the other set engages.

In order to obtain a rapid and simple axial movement of the coupling member, at least two rods may be connected to the coupling member, the rods being longitudinally slidable and rotatable about the axis of the spindle with respect to the carrying member, the rods being secured to a longitudinally movable control member (preferably a plate) for controlling the position of the coupling member.

The adjustment device of the invention may be used in tube presses having a piercing mandrel either behind or in front of the press cylinder. In the latter case, in particular, the coupling member may have a sleeve which engages in a bore in the spindle and is rotationally fixed with respect to the spindle, in order to reduce the length of the carrying member and hence of the press as a whole.

In general, the coupling member is preferably rotationally fixed with respect to the spindle by having at least one longitudinal groove in the spindle in which engages a projecting member on the coupling member. In the specific case of the coupling member having a sleeve, referred to above, a coupling member having such a projecting member engaging in a groove in a bore in the spindle has the advantage over a coupling member with a projecting member engaging in a groove in the screw-threading in the spindle in that the length of the spindle required is substantially shorter because the paths of movement of the projecting member and of the screw-threading are located at the same position along the spindle, whereas in the latter case, the paths of movement must be displaced from each other because the nut and the projecting member cannot be superimposed.

The invention will be further described, by way of example, with reference to the accompanying drawing, in which:

FIG. 1 is a vertical section through a ram crosshead and adjacent parts of a press in accordance with the invention, taken along the line of I—I of FIG. 2;
FIG. 2 is a section along the line II—II of FIG. 1;
FIG. 3 is a section along the line III—III of FIG. 2; and
FIG. 4 illustrates part of FIG. 1, on a larger scale.

A hollow ram piston 2 is able to slide longitudinally in a cylinder 1 and act upon a crosshead 3. The front of the latter (left-hand side in FIG. 1) is a hollow press ram 4 which may be pushed into a container (not shown) having a die. The crosshead 3 contains a hollow cylinder 5, the rear end of which projects into the hollow ram piston 2.

A piston 6 slides in the hollow cylinder 5 and is able to push the mandrel crosshead, which is composed of parts 7,8,9, towards the left relative to the ram crosshead 3. The crosshead 3 is provided on either side with an opening 10, out of which arms 38 of the mandrel crosshead 7,8,9, extend. The ram crosshead 3 slides on inclined sliding surfaces 13 as indicated in FIG. 3, while the mandrel crosshead is able to slide in a longitudinal direction on the lower part of the ram crosshead 3 by means of guide strips 14. A mandrel holder 15 is able to slide longitudinally in the crosshead 7,8,9. The right-hand end of the mandrel holder 15 is provided with a mandrel supporting spindle 16 with external threading 17. On its left-hand end the mandrel holder 15 carries, conventionally, a mandrel 18. The effective length of the mandrel is variable because it is desirable that the press functions satisfactorily with mandrels 18 of different lengths. This is why the mandrel holder 15 is made longitudinally slidable relatively to the mandrel crosshead 7,8,9.

The spindle 16 is enclosed by a nut 19 which is rigidly connected to a sleeve 20. This sleeve 20 carries a worm wheel 21 which is driven by a worm 22 arranged in the part 8 of the mandrel crosshead 7,8,9 (FIG. 4). The worm 22 may be driven by an electric motor (not shown in the drawing). The nut 19 is itself rotatably mounted in and carried by the mandrel crosshead 7,8,9 (which thus acts as a carrying member for the nut), the mandrel crosshead 7,8,9 both carrying the nut by way of bearing surfaces engaging the nut directly and carrying the nut by way of the spindle 16.

The sleeve 20 is provided at its end with coupling dogs 23 with which coupling dogs 24 of a changeover coupling 25 can mesh. The coupling 25 also has dogs 26 in which engage appropriately shaped dogs 27 on a fixed sleeve 28, when the coupling 25 is, as shown in FIG. 4, pushed towards the right. The sleeve 28 is fixed in a central bore in the mandrel crosshead part 9, and, although the sleeve 28 moves longitudinally with the mandrel crosshead 7,8,9 the sleeve 28 cannot rotate. A long coupling sleeve 29 of the coupling 25 projects into the spindle 16 and carries a spline or key 30 which excludes the possibility of the spindle 16 and sleeve 29 rotating relatively to each other but does permit the two parts to effect a relative longitudinal movement.

The changeover coupling 25 may be pushed in an axial direction by two or more rods 31 connected to a control disc 32. If this disc is pushed in the direction of the arrow 33 (FIG. 4), the changeover coupling 25 also moves towards the left, the coupling between the dogs 26 and 27 is broken and a coupling effected between the dogs 23 and 24.

Pistons 35 are rigidly secured to an intermediate wall 36 of the ram crosshead 3 and project into hydraulic cylinders 37, which are rigidly mounted in the arms 38 of the part 7 of the mandrel crosshead 7,8,9. When the cylinders contain pressurized fluid, they thrust the mandrel crosshead 7,8,9 within the ram crosshead 3 towards the right, i.e., backwards. The arms 38 further have two apertures 39, through which there project rods 40. The right-hand end of each rod 40 is fixed, being rigidly secured to the press cylinder 1.

Each rod 40 carries at its left-hand end a bayonet member 41 and a corresponding hollow bayonet member 42 is inserted in each aperture 39. The two hollow bayonet members 42 each carry a lever 43, as is shown only in FIG. 3. The lever 43 forms an angle of 22.5° with the vertical. The ends of both levers 43 are articulated to a control rod 44. If the latter is pushed towards the left in the direction of the arrow 45, the two hollow bayonet members 42 are turned through 45° and in this position no longer allow passage to the bayonet member 41 so that the bayonet member 41 forms a stop for the arms 38 of the mandrel crosshead 7,8,9, when this latter is advanced towards the left.

Pistons 47 are also rigidly connected to the arms 11 and 12 of the ram crosshead and extend towards the rear, i.e., to the right, where they project into the press return cylinder 48. Finally, the arms 11 and 12 each have a hole 49, through which is passed the respective rod 40. The holes 49 serve as abutments for the rods 40.

If a billet is to be pierced, the piercing piston 6 of the cylinder 5 is actuated by pressurized fluid so that the mandrel crosshead 7,8,9 is moved towards the left, causing the mandrel 18 to project out of the press ram 4 and travel through the container into the die, so that the billet is pierced. After the billet has been pierced, the tube can be extruded by introducing a higher pressure into the press cylinder 1. The mandrel crosshead 7,8,9 does not now travel towards the left but abuts with its arms 38 or hollow bayonet members 42 on the bayonet members 41.

As a result of this abutment, the mandrel 18 is held fast during the extrusion process, assuming, of course, that the valves in the piercing cylinder 6 are open. After the extrusion process, the ram crosshead 3 is retracted. If it is desired to use a shorter mandrel 18 than that shown, the point of the mandrel must take up the same position relative to the die as did the previous mandrel. To ensure that it does so, the mandrel holder 15 is moved to the left relatively to the mandrel crosshead 7,8,9, for a distance equal to the amount by which the new mandrel is shorter than the mandrel 18 shown in the drawing. This is effected by turning the nut 19, thus causing the spindle 16 of the mandrel holder 15 to be pushed towards the left because it is prevented from rotating by the key or spline 30. The next working cycle may then take place in the manner already described.

It is, of course, necessary for the mandrel 18 to be able to rotate about its longitudinal axis if tubes with a cross-sectional shape other than circular are to be extruded. This conventional rotation of the mandrel 18 about its longitudinal axis is made possible by pushing the changeover coupling 25 towards the left as shown in FIG. 4. The changeover coupling 25 is then freed from the dogs 27 on the fixed sleeve 28 so that when the worm 22 rotates with the nut 19, the spindle 16 of the mandrel holder 15 also rotates. The worm 22 thus now serves to rotate the mandrel 18.

I claim:
1. A press for forming tubes, the press having
   a mandrel holder,
   a screw-threaded spindle connected to the mandrel holder,
   a rotatable nut for adjusting the position of the spindle and of the mandrel holder in a longitudinal direction,
   a carrying member carrying the nut, the carrying member being movable in a longitudinal direction with respect to the press,
   means for rotating the spindle and moving the spindle longitudinally,
   a coupling member movable in a longitudinal direction with respect to the spindle and to the nut but rotationally fixed with respect to the spindle, and
   means for moving the coupling member in a longitudinal direction between one position in which the coupling member couples with the nut, thereby permitting rotation of the spindle, and another position in which the coupling member couples with the carrying member, thereby permitting longitudinal movement of the spindle.

2. A press as claimed in claim 1, wherein said positions of the coupling member are end portions of its longitudinal movement with respect to the nut.

3. A press as claimed in claim 1, wherein the coupling member has teeth or dogs on each of opposite end portions, and the nut and the carrying member have corresponding teeth or dogs, whereby in said one position the teeth or dogs on the nut engage with the teeth or dogs on one end portion of the coupling member and in said other position the teeth or dogs on the carrying member engage with the teeth or dogs on the other end portion of the coupling member.

4. A press as claimed in claim 1, wherein at least two rods are connected to the coupling member, the rods being longitudinally slidable and rotatable about the axis of the spindle with respect to the carrying member, the rods being secured to a longitudinally movable control member for controlling the position of the coupling member.

5. A press as claimed in claim 1, wherein the coupling member has a sleeve which engages in a bore in the spindle and is rotationally fixed with respect to the spindle.

6. A press as claimed in claim 1, wherein the spindle has at least one longitudinal groove and the coupling member has a projecting member engaging in the groove.

* * * * *